US005555977A

United States Patent [19]
Oshry et al.

[11] Patent Number: 5,555,977
[45] Date of Patent: Sep. 17, 1996

[54] SLEEVE AND STORAGE DEVICE FOR PLANAR ARTICLES

[75] Inventors: Scott J. Oshry; Sean B. Brosmith, both of Palos Verdes, Calif.

[73] Assignee: Roundhouse Products, Inc., Santa Monica, Calif.

[21] Appl. No.: 503,469

[22] Filed: Jul. 18, 1995

Related U.S. Application Data

[63] Continuation of Ser. No. 131,079, Oct. 1, 1993, abandoned.

[51] Int. Cl.⁶ .................................................. B65D 85/57
[52] U.S. Cl. ......................... 206/308.1; 40/379; 40/405; 206/425; 206/311
[58] Field of Search .......................... 206/309–313, 206/425, 308.1, 445; 211/40; 40/377, 379, 405, 493, 536, 537, 404

[56] References Cited

U.S. PATENT DOCUMENTS

| D. 258,897 | 4/1981 | Glaubinger . | |
|---|---|---|---|
| D. 300,148 | 3/1989 | Osofsky et al. . | |
| D. 303,042 | 8/1989 | Mackey | 206/311 |
| D. 323,428 | 1/1992 | Wang | 206/311 |
| D. 333,610 | 3/1993 | Oshry et al. . | |
| 1,287,842 | 12/1918 | Betts | 206/311 |
| 3,077,263 | 2/1963 | Froehlig | 206/313 |
| 4,263,357 | 4/1981 | Holson | 206/311 |
| 4,327,831 | 5/1982 | Inaba et al. | 206/311 |
| 4,508,366 | 4/1985 | Brindle | 206/311 |
| 4,602,447 | 7/1986 | Feingold | 40/405 |
| 4,778,047 | 10/1988 | Lay | 206/425 X |
| 4,850,731 | 7/1989 | Youngs . | |
| 4,906,057 | 3/1990 | Davi et al. | 206/425 X |
| 5,154,284 | 10/1992 | Starkey | 206/311 |

FOREIGN PATENT DOCUMENTS

| 241553 | 11/1962 | Austria | 206/311 |
|---|---|---|---|
| 2648363 | 4/1978 | Germany | 206/312 |
| 0676699 | 2/1991 | Switzerland | 206/312 |
| 927597 | 5/1963 | United Kingdom | 211/40 |

Primary Examiner—Bryon P. Gehman
Attorney, Agent, or Firm—Loeb & Loeb LLP

[57] ABSTRACT

A sleeve member for storing at least one substantially planar article, such as a compact disk (CD) comprises a sleeve and a connecting member. The sleeve has an opening and encloses a space adapted to receive the planar article. The connecting member is affixed to the sleeve and defined therein an opening adapted to receive a rail.

6 Claims, 11 Drawing Sheets

SLEEVE AND STORAGE DEVICE FOR PLANAR ARTICLES

This is a continuation of application Ser. No. 08/131,079 filed on Oct. 1, 1993, now abandoned.

FIELD OF THE INVENTION

The present invention relates to an improved storage device for articles, for example substantially planar articles such as compact disks. In particular, the invention relates to a storage device including at least one sleeve for an article and a base for holding the sleeve.

BACKGROUND OF THE INVENTION

The compact disk, or CD, has become a preferred medium for recording music and other audio information (as well as other types of information that can be digitally recorded), displacing the older vinyl recordings (LP's). Their small size, large digital storage capacity and durability have won the favor of consumers, who have purchased large quantities of CD's in recent years.

CD's are conventionally sold in rigid plastic cases, or "jewel cases", which can easily be stacked. However, large stacks of CD's make access to individual CD's difficult, and are also liable to being upset. The large thickness of the jewel cases relative to the CD's also increases the volume required for storage of the CD's.

Attempts have been made to provide devices for storing CD's in a convenient manner. For example, shelves and "bookcase"-type storage units have been produced. Another alternative has been the "tower"-type storage unit, in which CD's, in their jewel cases, are disposed in vertically-arranged slots or shelves. Variants of this type of unit include multiple-stack units mounted on turntables. Such units, however, are bulky, often have limited storage capacity, and only display the edges of the CD's, making it more difficult to identify the CD's so stored. Furthermore, a desired CD may be located at the bottom of a tower unit, thus requiring the user to stoop to floor level to retrieve the CD.

A need has existed for devices for storing articles, such as CD's, which have high storage capacity, are compact, and afford ready identification of and access to the stored articles.

SUMMARY OF THE PREFERRED EMBODIMENTS

In accordance with one aspect of the present invention, there has been provided a sleeve member for storing at least one article, for example a substantially planar article, which comprises a sleeve and a connecting member. The sleeve has an opening and encloses a space adapted to receive the article. The connecting member is affixed to the sleeve and has defined therein an opening.

In a more specific aspect of the present invention, the sleeve is comprised of at least one sheet, preferably of a flexible material such as a transparent plastic. A single sheet can be folded and sealed along a portion of its perimeter to form the sleeve. Alternatively, a plurality of superimposed sheets can be bonded together along a portion of their perimeters to form the sleeve.

In a preferred embodiment, the sleeve is comprised of three overlapping sheets which are bonded together to form two spaces for receiving two said planar articles. One of the sheets forms a common divider between the two spaces so formed.

In accordance with another aspect of the present invention, a storage device for substantially planar articles has been provided. The storage device includes a base having a rail, and at least one sleeve member as set forth above.

In a more specific embodiment, the base of the storage device includes a plurality of rails, preferably two rails. The rails can be integral with the base, or can be affixed to the base. The base can also include a stopping member to prevent the sleeve members from falling to a horizontal orientation.

In a preferred embodiment, the storage device also includes at least one divider having an opening adapted to receiving a rail.

In another preferred embodiment, the storage device can also include a casing adapted to at least partially enclose the base and the sleeve member or members. The casing can be comprised of a flexible material, such as a fabric, which is sealable, for example with a zipper. Alternatively, the casing can be a rigid cover for the base, and can be at least partially transparent.

According to another aspect of the present invention, a method is provided for storing an article. The method includes the steps of placing the article in a sleeve member as described above, and connecting the sleeve member to a base member having a rail by receiving the rail within the opening in the connecting member of the sleeve member.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

In the figures, like elements are labeled identically throughout.

DETAILED DESCRIPTION OF THE PREFERRED EMBODIMENTS

Figure 1:
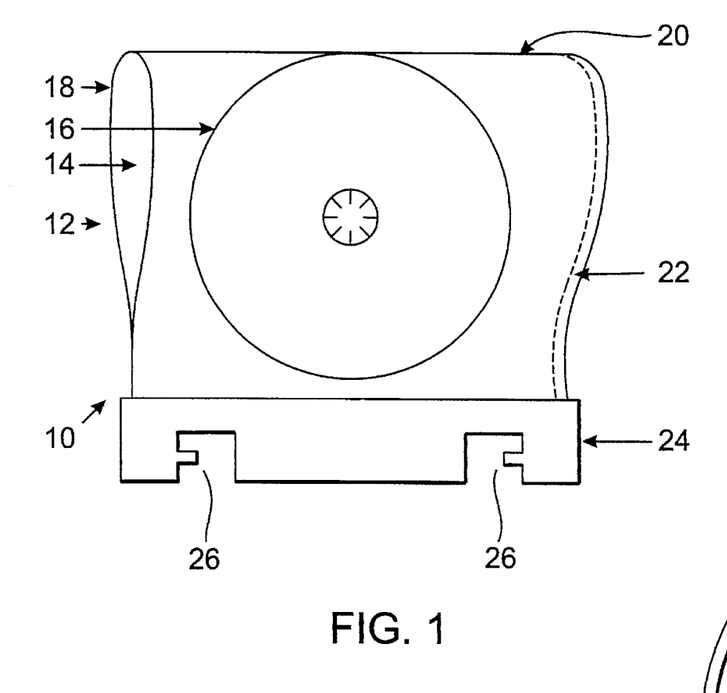
FIG. 1 is a plan view of a first embodiment of a sleeve member according to the invention, in which a single folded sheet is used to define the space adapted to receive the planar article.

Referring now to the drawings, in FIG. 1 a first embodiment of a sleeve member 10 according to the invention includes a sleeve 12, having an opening 14, which is adapted to receive an article. As illustrated, the exemplary stored article is a substantially planar article 16, specifically a compact disk (CD). As used herein, a "substantially planar article" is an article which has a height and width much greater than its depth, and which has a substantially flat configuration or which can be caused to assume such a configuration. The article can be rigid or flexible. Exemplary substantially planar articles include without limitation CD's, including recordable CD's, CD cover booklets, CD-ROM's, phonograph records such as LP's, laser disks, cassette tapes, computer floppy disks and microdisks, trading cards such as sports cards, photographs, etc. In a particularly preferred embodiment, the received article is a CD, without its jewel case.

If desired, the stored article can also be a non-planar article, that is, an article having a depth which is comparable to its height and/or width. Such non-planar articles can include, without limitation, collector's pins, mounted insects such as butterflies, bottle caps, medals, souvenirs such as spoons, jewelry such as rings, etc. Sleeve 12 can be appropriately adapted in such cases to receive the desired non-planar article.

Sleeve 12 is formed from single sheet 18, which can be comprised of any foldable material. Preferably, the material is a flexible material, particularly preferably a transparent plastic material such as polypropylene, polyethylene, polyvinyl chloride or other conventional polymeric materials. Polypropylene is particularly preferred. The transparent material can be clear or can be tinted, if desired. The material can also be a multilayer material which can be sealable, for example heat-sealable. Transparent materials allow the articles, such as CD's or CD cover booklets, to be located visually. Other foldable materials, such as paper, could also be used if desired.

Sheet 18 is folded along fold 20 and sealed at a portion of its perimeter along seal line 22 by any desired means, for example using an adhesive, by sonic welding, heat-sealing, by use of mechanical fasteners such as staples or rivets, etc. Connecting member 24 is in turn affixed to sleeve 12, forming joint 28 as shown in cross-section in FIG. 2.

Figure 2:
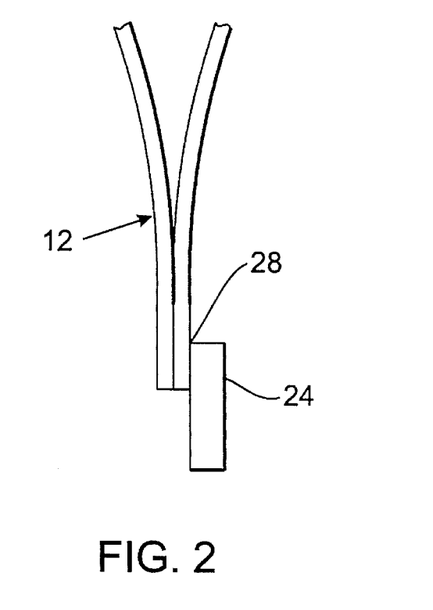
FIG. 2 is a side view of the connecting member of a sleeve member according to the invention illustrating one mode of affixing the connecting member to the sleeve.

Any desired means can be used to affix connecting member 24 to sleeve 12. Moreover, one or both halves of sheet 18 can be affixed to connecting member 24, that is, sheet 18 can be symmetrically or asymmetrically folded, with both folded ends being even (as shown in FIG. 2), or with one end extending beyond the other.

Connecting member 24 can be formed from any desired material, and preferably is formed from a plastic material, which can be rigid or flexible, and preferably is resilient. This material preferably is compatible with the material used to form sleeve 12, especially if sleeve 12 and connecting member 24 are to be joined by an adhesive or by a welding technique. Polypropylene is a preferred material for use in forming connecting member 24, particularly when used together with a sleeve 12 of polypropylene. Connecting member 24 has defined therein openings 26. Two openings are illustrated in FIG. 1; however, more or fewer openings could also be selected according to the number of rails included in the type of base with which sleeve member 10 is contemplated to be used.

Figure 2A:
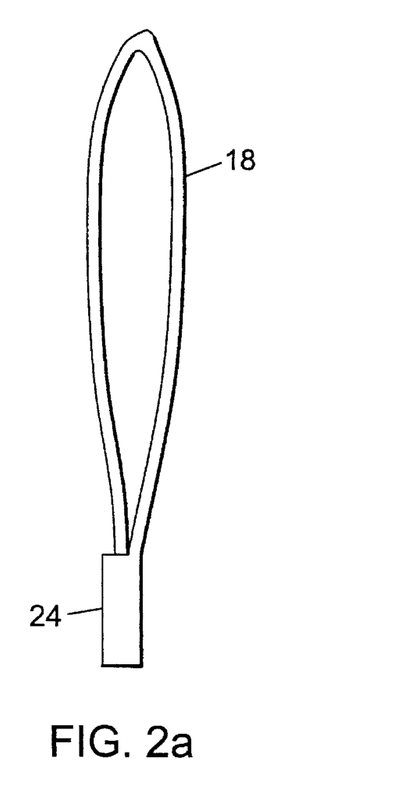
FIG. 2a is a side view of a sleeve member in which the sleeve and the connecting member are integral.

In another embodiment, shown in FIG. 2*a*, connecting member 24 is integral with sheet 18. This can be effected, for example, by employing a molded, cast or formed sheet 18 having a bottom section of an appropriate thickness to form connecting member 24. Openings 26 can be formed by punching, cutting, etc. Alternatively, an appropriately configured die can be used in a molding or casting process to produce sheet 18 with connecting member 24 having openings 26 defined therein. Sheet 18 is then folded as above and sealed to form sleeve 12.

The shape of each opening 26 is selected to receive a rail, that is, a rigid unitary extended member the greatest cross-sectional diameter of which is small in proportion to its length. Connecting member 24, with opening 26, acts similarly to a clip to connect the sleeve member to the rail, particularly when comprised of a resilient material. Such a material can be deformed, or bent, to allow the connecting member to be pressed into position on the rail and then resumes its original configuration once so disposed in relation to the rail.

Figure 3A:
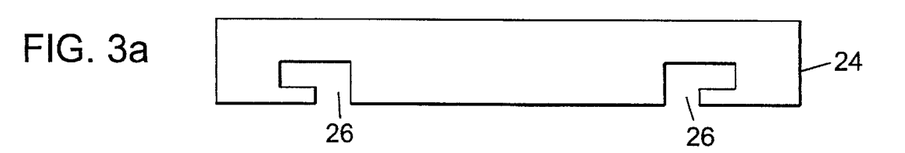
FIGS. 3a–3c illustrate alternative configurations of openings in the connecting member of a sleeve member to the invention.
Figure 3B:
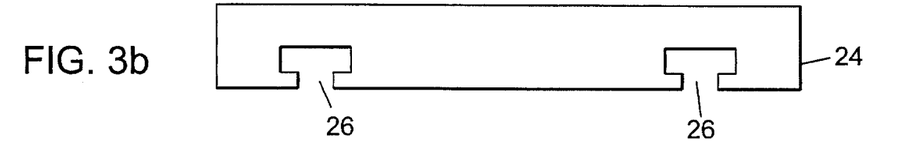
Figure 3C:
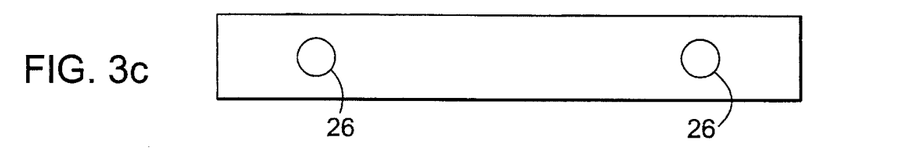

Preferably, opening 26 is shaped such that the rail is slidingly and securingly received. That is, sleeve 10, having received the rail in openings 26, is free to move along the length of the rail ("slide") but resists moving in a direction perpendicular to the rail (is "secured"). Greater or lesser resistance to motion in the perpendicular direction can be achieved through design choice of the materials used to form the connecting members and of the detailed configuration of the openings 26. The openings 26 shown in the embodiment of FIG. 1 are adapted to receive a rail having an inverted L-shaped cross-section. FIGS. 3a–c illustrate alternative openings 26 adapted to received rails having inverted L-shaped, T-shaped and circular cross-sections, respectively. Other shapes could also be used, depending on the cross-section of the rails which the sleeve members are intended to receive.

The embodiment in FIG. 3c is suitable for use with storage devices having rails which are removably affixed at one or both ends to a base. The sleeve member 10 is then "threaded" onto the free end of the rail, which is then reaffixed to the base of the storage device.

Figure 4:
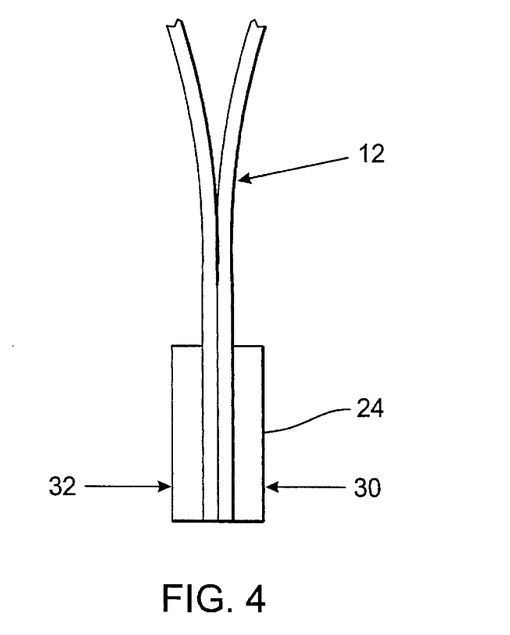
FIG. 4 is a side view of an alternative embodiment of a connecting member which includes two sections between which the sleeve is affixed.

In FIG. 4, an alternative embodiment of connecting member 24 includes first half 30 and second half 32, between which the bottom of sleeve 12 is affixed, or sandwiched.

Figure 5:
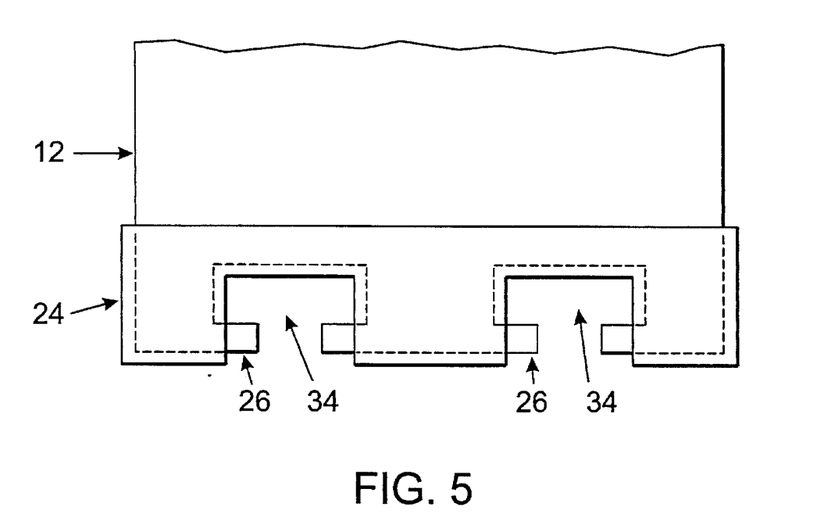
FIG. 5 is a plan view of an alternative embodiment of the connecting member of FIG. 4 in which the bottom of the sleeve has defined therein openings of a different shape from those defined in the connecting member, and wherein the sleeve and the connecting member combine to define openings adapted to receive rails.

In FIG. 5 a variant embodiment of a sleeve member having a connecting member 24 as shown in FIG. 4 includes a sleeve 12 having openings 34 defined at the bottom of at least one folded half thereof. Openings 34 can be of a different shape from that of openings 26 in connecting member 24, as shown, or can be of the same shape. In either event, both sleeve 12 and connecting member 24 cooperate to define openings adapted to receive rails.

Figure 6:
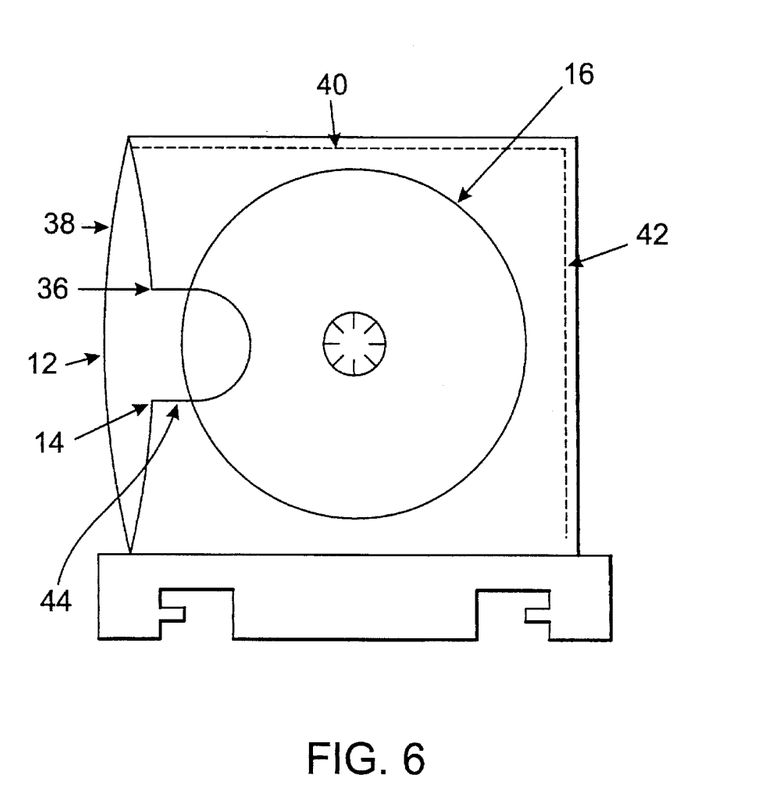
FIG. 6 is a plan view of a second embodiment of a sleeve member according to the invention, in which two superimposed sheets are bonded together to define the space adapted to receive the planar article.

In FIG. 6, sleeve member 10 includes sleeve 12 which is formed from first and second sheets 36 and 38, superimposed and sealed together along seal lines 40 and 42. Opening 14 is formed on the side at which the two sheets 36 and 38 are not sealed. The sheets can again be formed of any desired material, and preferably are formed of a flexible material, particularly a transparent plastic material.

As shown in FIG. 6, sleeve 12 can have an indentation 44 at least one edge of opening 14. Such an indentation facilitates access to an object 16, such as a CD, disposed within sleeve 12.

Figure 7:
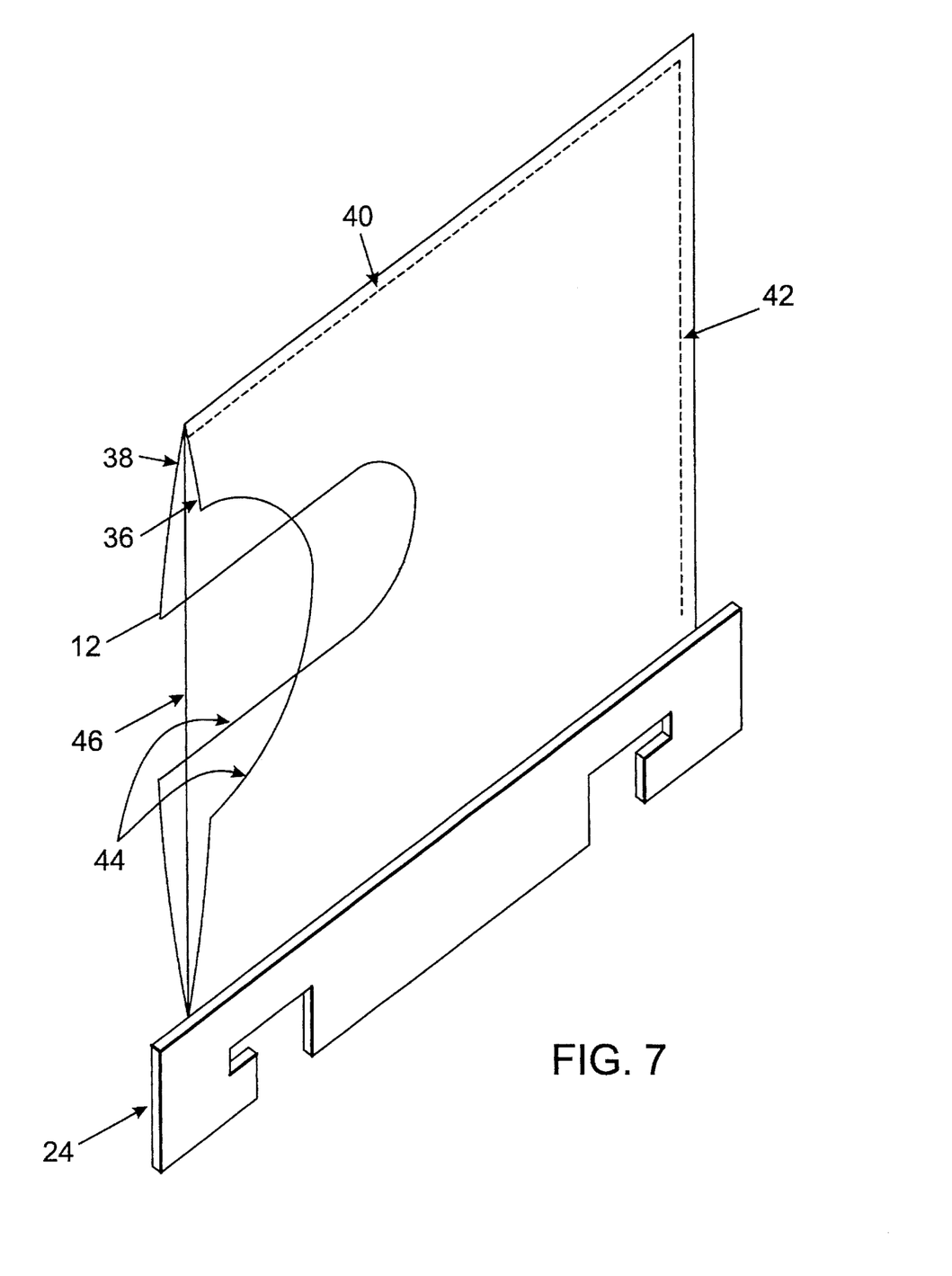
FIG. 7 is perspective view of a third embodiment of a sleeve member according to the invention, in which three superimposed sheets are bonded together to define two spaces adapted to receive planar articles.
Figure 8:
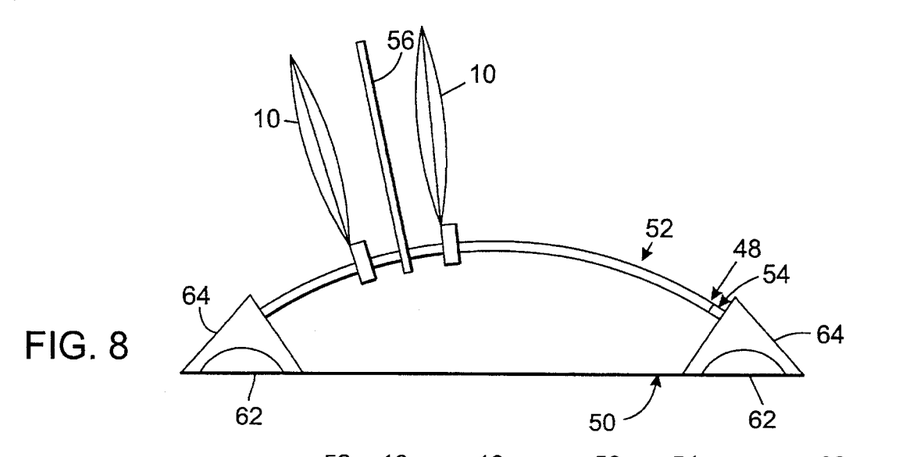
FIG. 8 is a side view of an embodiment of a storage device according to the invention, which includes two arcuate integral rails slidingly and securingly received within corresponding openings in the connecting members of a plurality of sleeve members and optional dividing member.

An embodiment adapted to receive two CD's or other substantially planar objects is shown in FIG. 7. Sleeve 12 is formed from first and second sheets 36 and 38, between which third sheet 46 is sandwiched. All three sheets 36, 38 and 46 are sealed together along seal lines 40 and 42. Each of first and second sheets 36 and 38 can have indentations 44. The indentations can be of different shapes, as shown, or can be of the same shape. As shown, two spaces are defined within sleeve 12, with third sheet 46 forming a common dividing surface between the two spaces. Each space is adapted to receive a CD or other substantially planar object. For example, a CD can be received in one of the spaces so defined, and its corresponding cover booklet can be received in the other space, affording easy identification of the CD stored within the sleeve member. Storage of the CD without its jewel case affords increased storage capacity due to the lesser thickness of the CD.

Although sleeves useful in producing a sleeve element according to the invention have been described as being formed by folding and sealing a flexible sheet, or by sealing a plurality of superimposed sheets, they are not limited to sleeve formed by such methods. Other methods of forming sleeves, such as molding, could also be employed, and sleeves formed by all such methods are contemplated as being within the scope of the invention.

Figure 9:
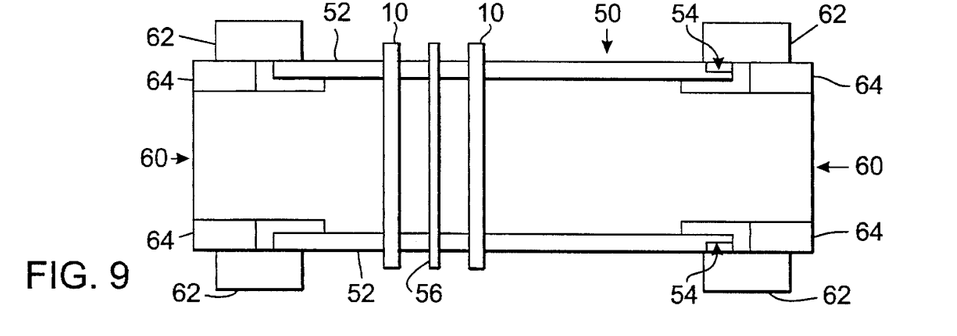
FIG. 9 is a top view of the embodiment of FIG. 8 showing the position and configuration of the rails and of two pairs of stopping members at either end of the rails.
Figure 10:
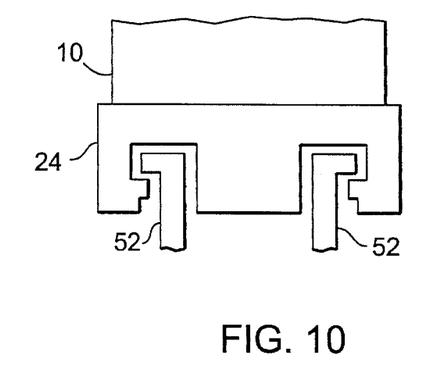
FIG. 10 is a partial cross-sectional view of the storage device of FIG. 8 showing the reception of the rails within the openings in the connecting member of a sleeve member.
Figure 11:
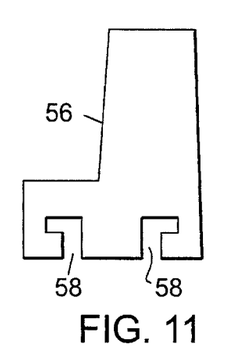
FIG. 11 is a plan view of a divider useful with a storage device of the invention for categorizing and/or alphabetizing the stored articles.

FIGS. 8–11 illustrate a first embodiment of a storage device 48 according to the invention, including a base 50 having two integral rails 52 (shown in FIG. 9) which have an inverted-L cross-sectional shape (shown in FIG. 10). In a particular embodiment, each rail 52 has a notch 54 at one end to facilitate placement of sleeve members 10 and optional dividers 56 in position with respect to rails 52. Sleeve member 10, including connecting member 24, is disposed with respect to rails 52 as shown in FIG. 10. Notch 54 is optional, however, particularly if connecting members 24 of sleeve members 10 are sufficiently flexible or resilient.

Optional dividers 56 (an embodiment of which is shown in detail in FIG. 11) can be made of the same material as the connecting members 24 of sleeve members 10, or of a different material, and can have any desired shape. Each divider 56 has therein openings 58 corresponding to the openings 26 in connecting members 24 and adapted to receive rails 52. One or more dividers 56 can be provided with identification means, such as adhesive labels (not shown), thus allowing the stored articles to be categorized and/or alphabetized Base 50 can have any desired shape, and likewise rails 52 can have any desired shape, such as the arcuate shape shown in FIG. 8 or another shape. Base 50 can include two or more separators 60 maintaining rails 52 in spaced relationship, as shown in FIG. 9, or can include a solid base member connecting rails 52 along their entire length. Any other desired structures for maintaining rails 52 in spaced relationship can also be employed. Base 50 can also include extensions 62, if desired, for added stability. Base 50 can also include one or more stops 64 disposed at one or both ends of rails 52. The stops 64 prevent sleeve members 10 from falling to a horizontal position during storage.

Figure 12A:
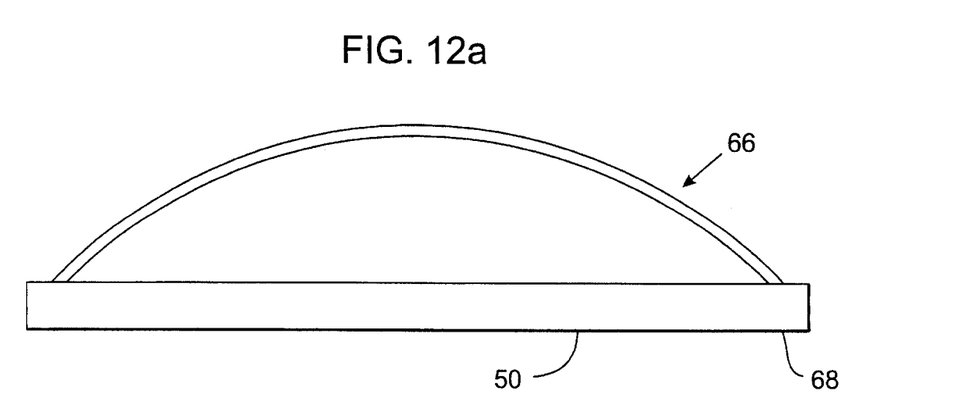
FIGS. 12*a*–12*b* are side views of alternative embodiments of a storage device according to the invention including rails which are affixed to the base member.
Figure 12B:
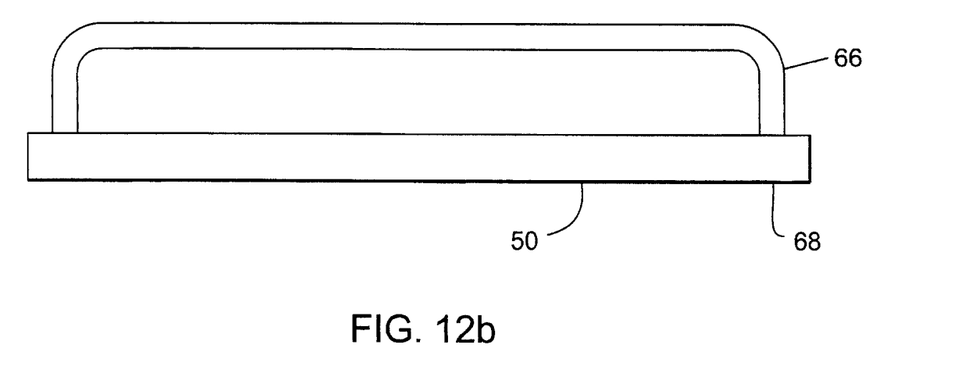

In FIGS. 12a–b, alternative embodiments of base 50 include non-integral rails 66 which are affixed to rigid support 68. Non-integral rails 66 again can have any desired cross-section, and can be formed from the same material as rigid support 68 or from another material. For example, rails 66 can be formed from metal rods which are bent to the desired shape and then affixed to rigid support 68 comprised of a wooden plank.

As noted previously, more or fewer than two rails can be used in producing a base for a storage device according to the invention, and the number of rails utilized is a matter of design choice.

A storage device according to the invention can optionally include a casing. As used herein, a "casing" is a structure which completely encloses base 50 and attached sleeve members 10, or which cooperates with base 50 to enclose sleeve members 10.

Figure 13:
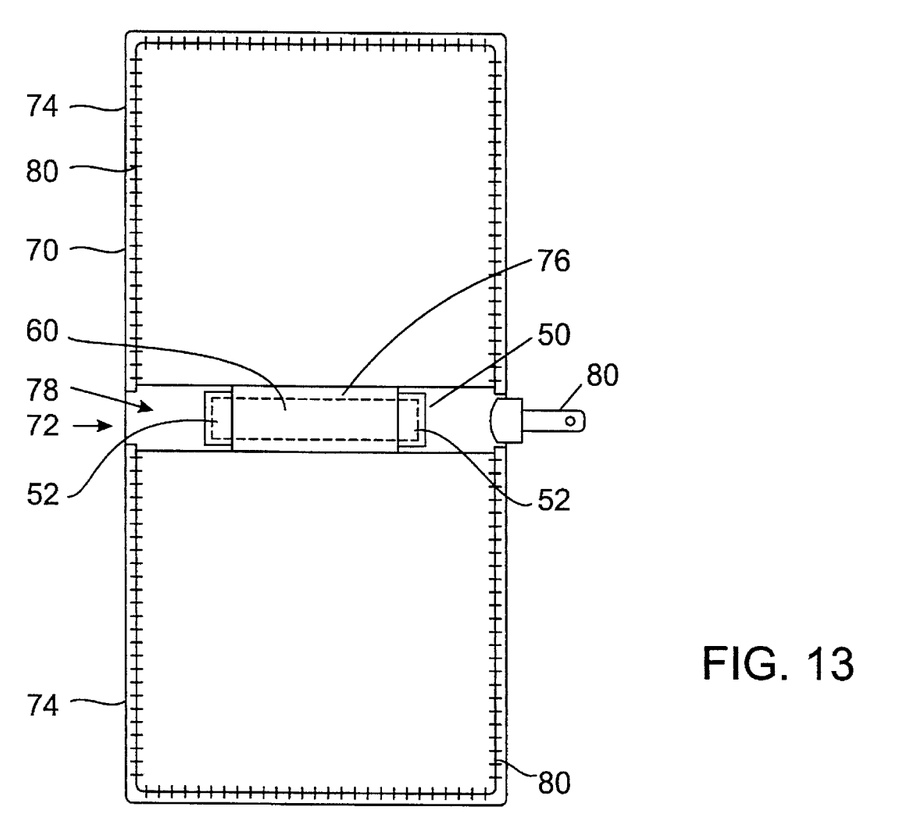
FIG. 13 is top view of an embodiment of a storage device of the invention having a casing adapted to enclose the base member and sleeve members, in which the casing is comprised of a flexible material which can be folded around the base and sleeve members and then sealed using a zipper.

A first embodiment of a storage device according to the invention which further includes a casing is illustrated in FIG. 13. Base 50, including integral rails 52 having inverted L-shaped cross-sections and separator 60, is enclosed by flexible casing 70 which includes end panel 72 and side panels 74. Rails 52 of base 50 are received within openings 26 in connecting members 24 of sleeve members 10 as shown in FIG. 14.

Base 50 is affixed to end panel 72, for example by means of flap 76 which can be affixed, such as by stitching, over separator 60 of base 50. Side panels 74 can optionally be reinforced with a stiff material, that is, they can be formed from inner and outer layers of a flexible material enclosing a stiff material, such as cardboard, to help the panels maintain their shape. Alternatively, side panels 74 can be comprised of a single or double layer of a flexible material without further reinforcement. End panel 72 can likewise be reinforced or unreinforced. End panel 72 can also be externally reinforced, by, for example, affixing a strip 76 of a stiff material such as an artificial leather to the inner surface thereof. Base 50 can then be enclosed between strip 78 and flap 76.

Casing 70 further includes a mechanism for sealing stored articles 16 therewithin. Such a sealing mechanism can be a zipper extending at least partially around the peripheries of end panel 72 and side panels 74, as shown in FIGS. 13 and 14, or any other desired mechanism, such as snaps, buttons, Velcro panels, etc.

Figure 14:
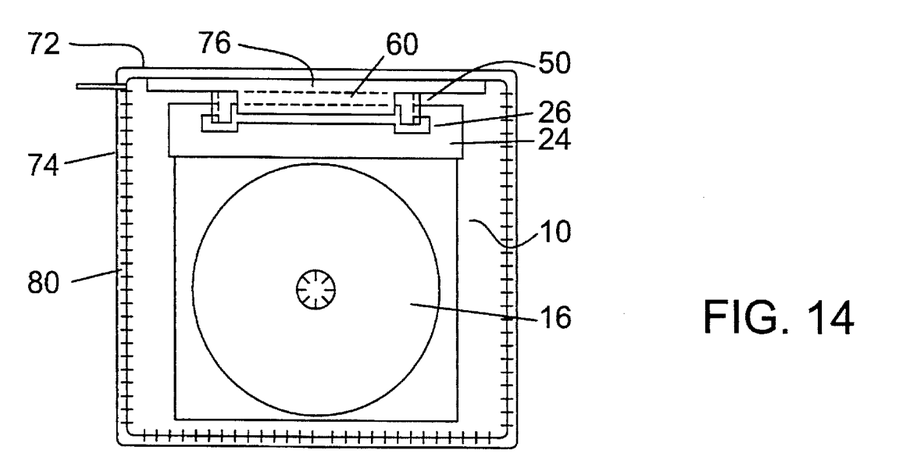
FIG. 14 is cross-sectional view of the embodiment of FIG. 13 in closed configuration.

Encased storage devices such as are illustrated in FIGS. 13–14 are useful, for example, as portable storage devices for CD's, etc. The bases 50 can be of any desired size, but typically are proportioned such that their length is less than their width (i.e., the rails 52 are disposed along the shorter sides of the base 50). Dimensions of the base 50, and thus of the casing 70 which encloses the base, are a matter of design choice based on, among other considerations, the desired storage capacity and the size of the planar articles to be stored.

Figure 15:
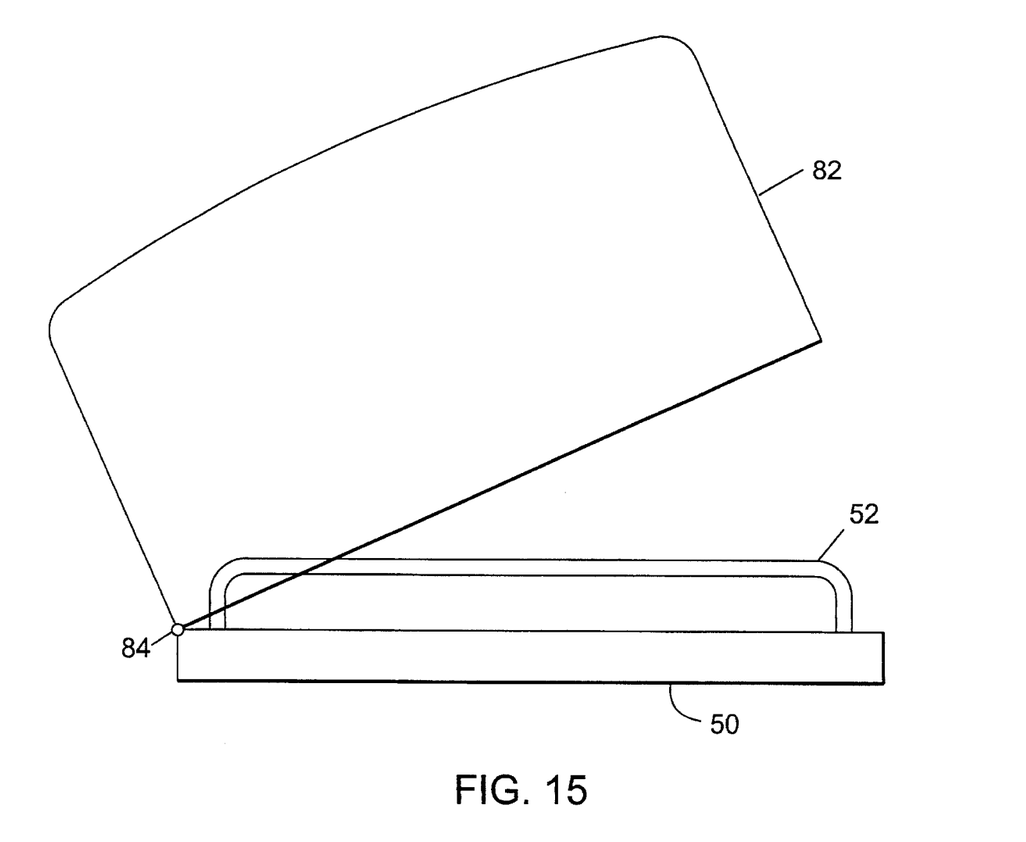
FIG. 15 is a side view of an embodiment of a storage device of the invention having a rigid casing in the form of a transparent cover.

FIG. 15 illustrates an alternative embodiment in which the casing includes a rigid cover 82, which preferably is at least partially transparent. Cover 82 is attached to base 50 by hinging mechanism 84, which can be any desired mechanism. Cover 82 can be permanently attached to base 50 via hinging mechanism 84 or can be removably attached thereto.

Figure 16A:
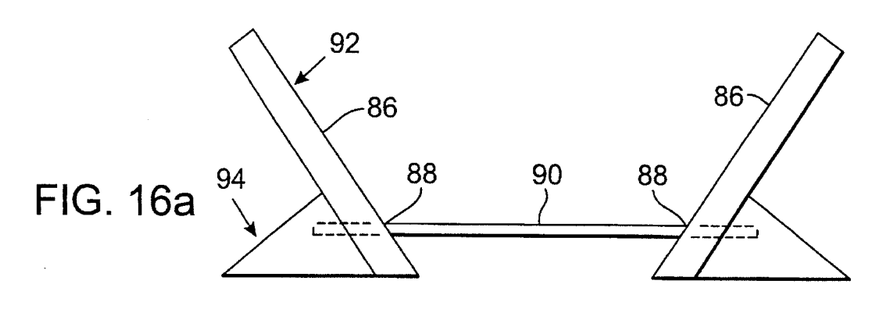
FIGS. 16*a*–16*c* depict a storage device of the invention having removable rails in profile, plan and perspective views, respectively.
Figure 16B:
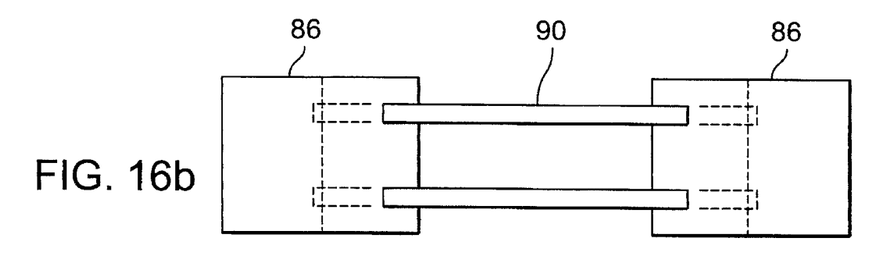
Figure 16C:
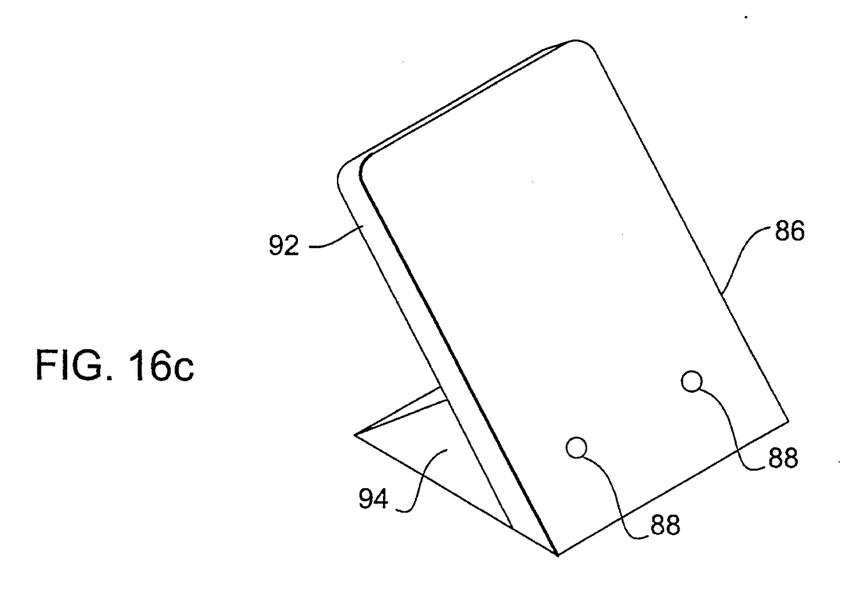

FIGS. 16a–c illustrate an embodiment of a storage device according to the invention having removable rails. Base ends 86 have defined therein openings 88 for receiving removable rails 90. One embodiment of base end 86 is formed of an inclined surface 92 affixed to a triangular prism-shaped support 94.

Figures 17A, 17B:
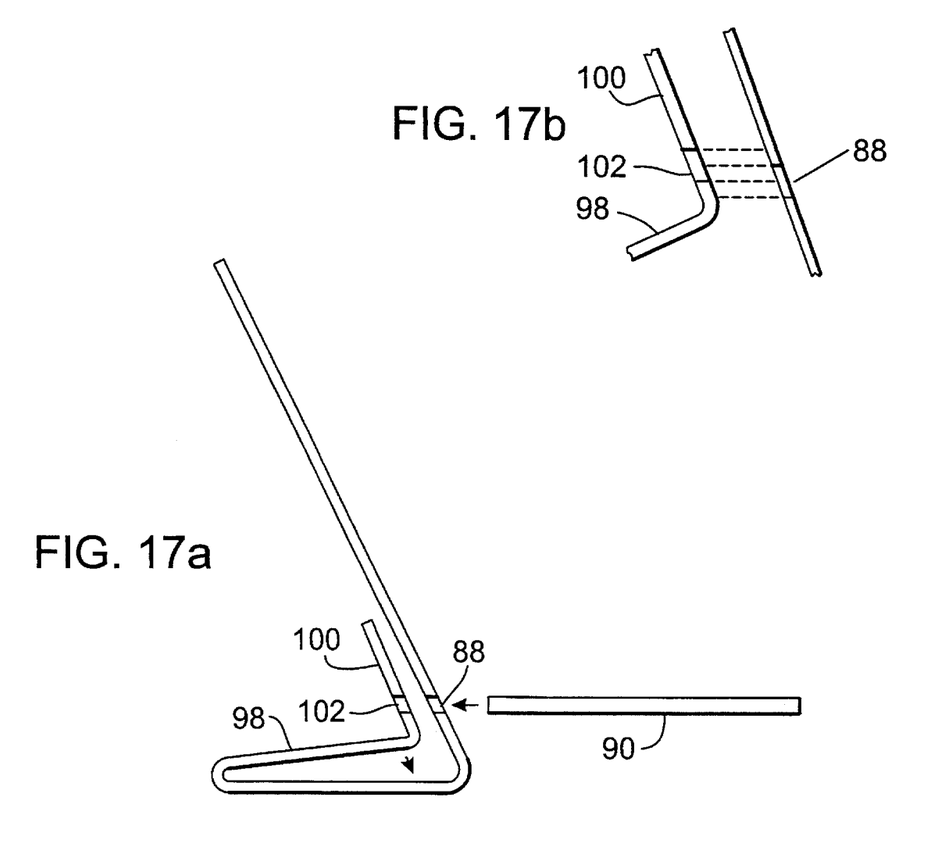
FIG. 17*a*–17*c* depict an alternative embodiment of a base useful with removable rails to form a storage device of the invention, in which a flexible, resilient material such as a plastic or metal is shaped into a configuration which functions to "lock" the removable rails in place.
Figure 17C:
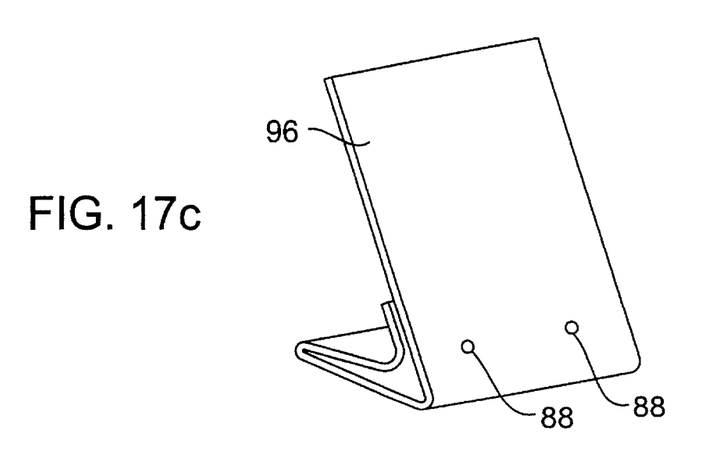

Another embodiment of a base end for use with removable rails is illustrated in FIGS. 17a–c. Spring base 96, having openings 88 as shown, is formed from a material such as a metal or plastic into a shape as shown. Arm 98 includes upwardly-entending flange 100 through which are defined openings 102. In its relaxed position, openings 88 and 102 are slightly offset, as shown in more detail in FIG. 17b. When flexed, openings 88 and 102 are brought into alignment to accommodate removable rail 90. Once rail 90 is inserted through openings 88 and 102, arm 98 presses upwardly against rail 90, thus securing the rail in place.

An advantage provided by storage devices according to the invention is interchangeability. That is, variations of the storage device, such as the embodiments of FIGS. 8–17c, can be designed to accommodate a common sleeve member design. Thus, for example, sleeves used with a non-portable storage device, such as the device of FIG. 8, can be removed from that device and used with a portable storage device, such as the device of FIG. 13.

Figure 18:
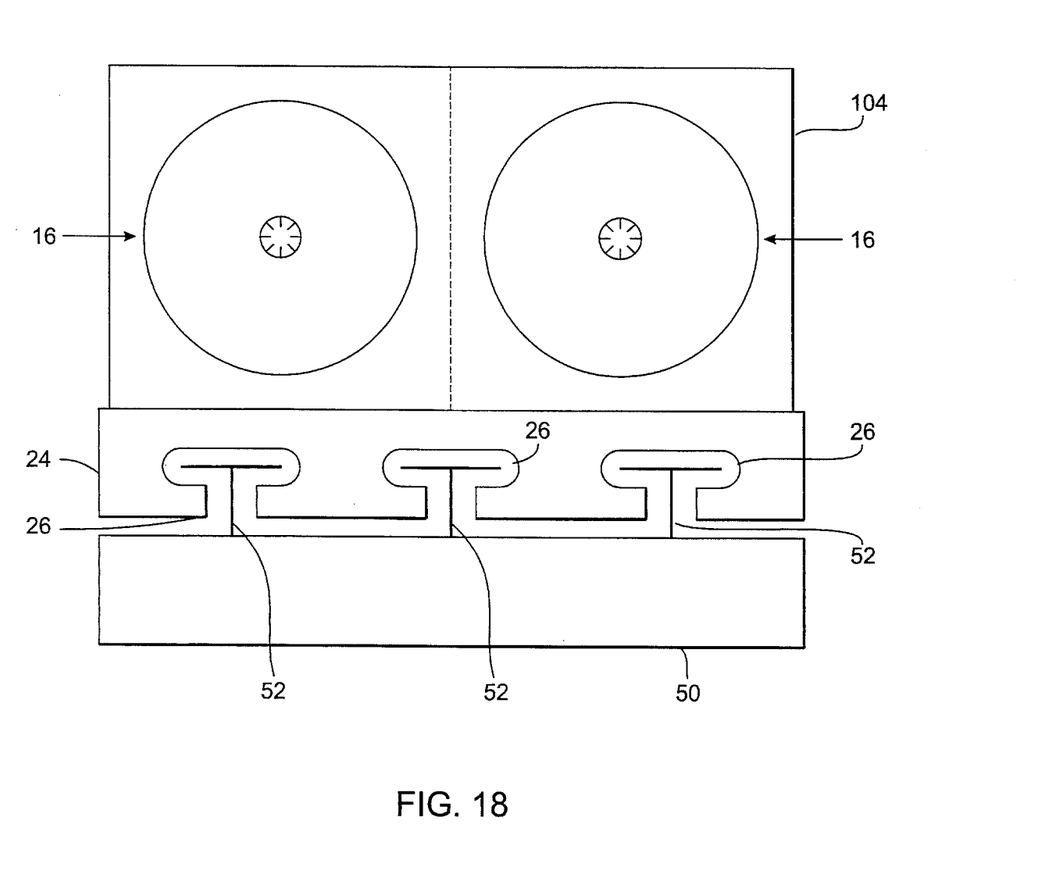
FIG. 18 is a plan view of a dual storage sleeve according to the invention.

FIG. 18 illustrates an alternative, "dual storage" embodiment 104 of a sleeve according to the invention, in which two openings are defined for receiving two articles 16 side by side. Three openings 26 are defined in connecting member 24 to receive three rails 52 mounted on a base 50. The three rails provide additional support for this embodiment of a sleeve member of the invention.

What is claimed is:

1. A storage device comprising:
    a plurality of sleeve members, each of said sleeve members comprising:
        a sleeve portion having an article receiving opening and enclosing a space adapted to receive a flat article; and
        a connecting portion supporting said sleeve portion and having an edge which faces away from said sleeve portion, said connecting portion having an opening which extends to, and opens at, said edge; and
    a flexible casing comprising:
        an end panel having two mutually parallel edges, and two side panels each pivotally connected to said end panel at a respective parallel edge for movement into positions in which said side panels face one another;
        a base secured to said end panel and having a rail which extends between said parallel edges, said rail being adapted to be inserted into said opening in said connecting portion of each of said sleeve members for detachably retaining each of said sleeve members in said casing; and
        a sealing mechanism associated with said side panels for sealing said casing when said side panels face one another.

2. The storage device of claim 1, wherein said rails are integral with said base.

3. The storage device of claim 1, wherein said rails are affixed to said base.

4. The storage device of claim 1, wherein said base comprises two rails.

5. The storage device of claim 1 wherein said base has a plurality of rails extending in parallel with one another.

6. The storage device of claim 1 wherein said sleeve portion and said connecting portion are both made of polypropylene.

* * * * *